Figure 1:
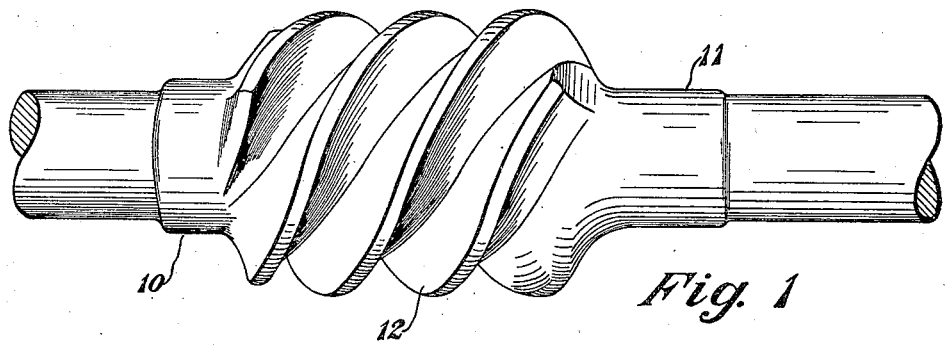

Aug. 6, 1929.   A. L. EICHER   1,723,773
FORGED GEAR WORM
Filed Nov. 5, 1926

Inventor
A. L. Eicher
By Frease and Bond
Attorneys

Patented Aug. 6, 1929.

1,723,773

UNITED STATES PATENT OFFICE.

ALBERT L. EICHER, OF CANAL FULTON, OHIO.

FORGED GEAR WORM.

Original application filed June 26, 1926, Serial No. 118,659. Divided and this application filed November 5, 1926. Serial No. 146,344.

The invention relates to forged worms for driving gears in automobiles and the like, and more particularly worms designed to be operated at high rotational speeds, worms for this purpose usually having multiple threads and a relatively long lead, and being subject to relatively severe wear and stresses; and this application is a division of my prior application for patent for an improved method of forging gear worms, filed June 26, 1926, Serial No. 118,659.

Gear worms made by a usual method of manufacturing which includes forging a cylindric blank and forming the worm threads therein by machine cutting away all of the material between the threads, are characterized by the fact that, by said process of manufacture, the particles of material are arranged in the forged cylindric blank in a manner to present the appearance of longitudinally extending arrangements of particles as viewed upon a longitudinal plane surface of the blank exposed by axially and longitudinally cutting the blank into two semi-cylindric pieces.

After machine cutting the worm threads in such a blank, and longitudinally and axially cutting the worm thus formed into two half worms, the longitudinal axial plane surface thus exposed of one of the half worms still presents the appearance of longitudinally extending arrangements of particles within the worm, and which are transversely severed by the machine cutting of the worm threads in the forged cylindric blank.

Moreover, in a gear worm machine cut from a forged cylindric blank, from the appearance of the surface exposed by longitudinally and axially cutting as aforesaid the gear worm into two half worms, the particles of material constituting the gear worm may be said to have a substantially uniform density throughout the worm.

If gear worms are made by the improved method of manufacture set forth in my prior patent, No. 1,474,516, it will be found, by longitudinally and axially cutting worms thus made at several different angles, that the particles constituting the worm are not arranged in the same manner at all longitudinal planes.

The exposed surface corresponding to an axial plane perpendicular to the top and bottom of the preliminary dies and to the opposed die faces, presents in that plane, the particles constituting the worm disposed in arrangements that at the outer portions of the worm are not cut through, but substantially follow the hill and valley contours of the threads.

On the other hand, in spite of the rectification by the finishing dies, of the distorted worm threads formed by the preliminary dies, it will be found by axially and longitudinally cutting a worm made according to the method of my foregoing patent along a plane corresponding to the horizontal plane of the worm as it is positioned in the preliminary dies, that is to say at right angles to the aforesaid vertical plane, that the surface thus exposed presents an arrangement of the particles constituting the worm at this plane which does not follow the hill and valley contour of the threads, and a substantial number of which are cut through near the base of the threads.

This cutting through of the arrangements of particles at the base of the threads is unavoidable when manufacturing worms according to the method of my aforesaid Patent No. 1,474,516 because of the fact that the preliminary thread dies repeatedly strike the stock positioned therein without any rotating until the distorted threads are shaped on the worm, and usually with the formation of fins along each side of the worm as in the aforesaid horizontal plane.

In other words, it may be possible to forge worms by the method of my aforesaid patent, having arranged particles in the vertical plane of the worm as it lies between the preliminary thread forming dies following the hill and valley contour of the threads and not cut through by the dies; but it is impossible not to cut through the arrangements of the particles in the horizontal plane of the worm as it lies between the preliminary thread forming dies.

It has been found by test that whenever by any manufacturing operation such as machine cutting or the cutting action as distinguished from the pressing or flowing action of dies, arrangements of particles are cut through, the resulting product is weaker than if the arrangements of the particles were not cut through.

Accordingly while worms forged according to the method of my prior patent as aforesaid, have not as many arrangements cut through as worms made by machine cutting a forged cylindric blank, and are consequently stronger, such forged worms have some arrangements cut through and are not uniformly strong at any axial longitudinal plane.

Moreover it has been found desirable to have, in a machine element such as worms, a greater denseness of particles arranged therein near the wearing surfaces than in the central portions thereof.

Accordingly, the objects of the present improvements are to provide a worm having particles in any longitudinal axial plane thereof, arranged following the hill and valley contour of the threads, and to provide a greater denseness of the particles of the worm at and adjacent the wearing surfaces thereof than in the central portion thereof.

From a different standpoint the objects of the present invention include the provision of a worm having helically continuously arranged particles rearranged from longitudinally continuous locations.

These objects are attained in the product of the present invention, and may be preferably made according to the improved method of forging gear worms set forth in my aforesaid application for U. S. Letters Patent, filed June 26, 1926, Serial No. 118,659 of which this application is a division.

The invention herein is illustrated in the accompanying drawing forming part hereof in which:—

Figure 2:
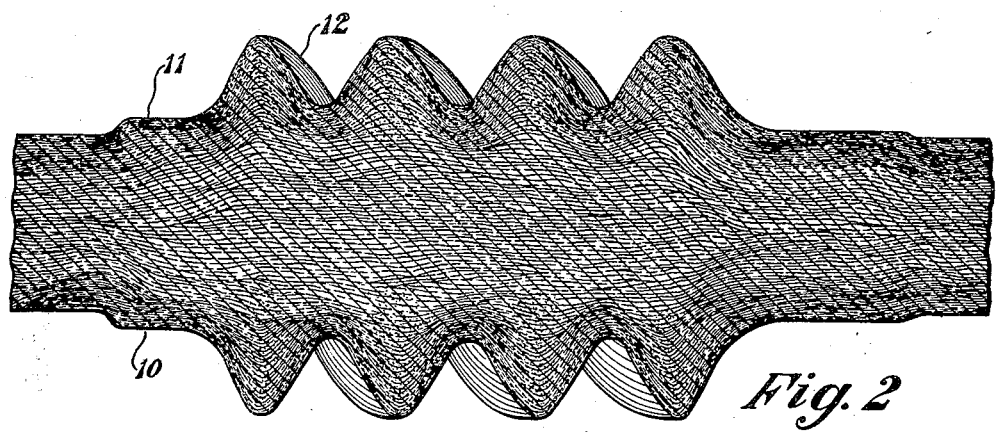
Figure 3:
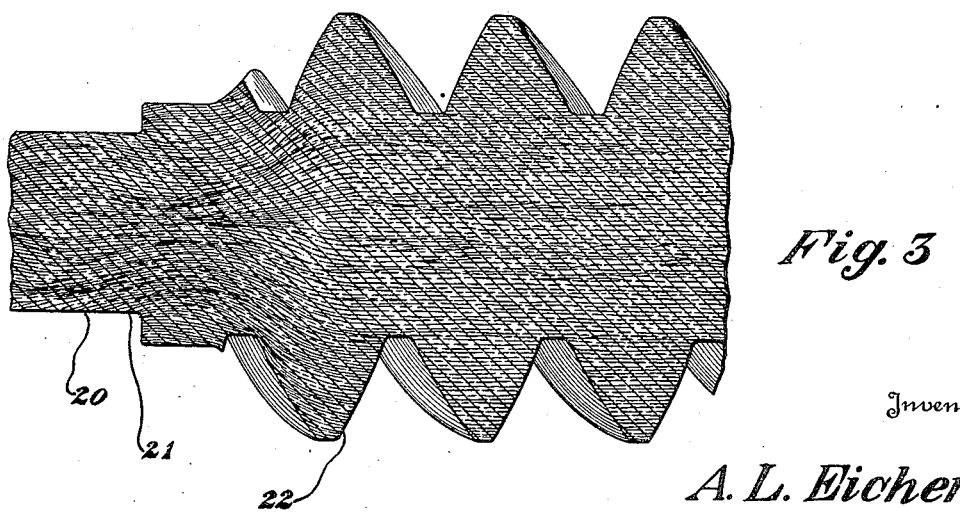

Figure 1 is a longitudinal fragmentary elevation of one of the improved gear worms having threads formed of a varying denseness of helically and longitudinally continuously arranged particles following the contour of the worm threads and having a greater denseness at and adjacent the wearing surfaces thereof than in the central portions thereof;

Fig. 2, an enlarged fragmentary view of the surface, as it appears in a photograph exposed upon one half of the worm of Fig. 1, by longitudinally and axially cutting the same along any axial plane; polishing and etching the exposed surface, thereby showing the grain structure; and Fig. 3, a view of the surface as it appears in a photograph exposed upon one half of a worm made by machine cutting threads in a forged cylindric blank, by longitudinally and axially cutting the same along any axial plane; polishing and etching the exposed surface, thereby showing the grain structure.

Similar numerals refer to similar parts throughout the drawings.

The gear worm 10 embodying the present improvements includes the shaft 11 about which worm threads 12 are spirally or helically formed or wound by the method of forging worms set forth in my prior parent application for patent, Serial No. 118,659.

The particles of material constituting the worm and threads thereof are in continuous, unsevered arrangements at any plane therein.

Fig. 2 illustrates the plane surface exposed upon one half of one of the improved worms by longitudinally and axially cutting the same into two half worms along any plane.

The particles constituting the worms are thus seen to be in continuous, unsevered arrangements which follow the contours of the worm threads at the outer portions of the worm.

Likewise it may be seen, that there is a varying denseness of particles following the contour of the threads and having a greater denseness at the outer portions thereof adjacent the wearing surfaces of the threads than in the central portions thereof.

Since the surface exposed in Fig. 2 was exposed by longitudinally cutting a worm along any longitudinal and axial plane, it is also apparent that the arrangements of particles constituting the worm are continuous and unsevered in all directions, spirally or helically, as well as longitudinally.

Fig. 3 illustrates the surface exposed by cutting along any longitudinal and axial plane a gear worm made by machine cutting the threads therein from a forged cylindric blank according to a usual and well-known method.

The machine cut gear worm 20 of Fig. 3 includes a shaft 21 upon which worm threads 22 are shaped by cutting away material between the threads.

Fig. 3 clearly illustrates that the particles constituting a machine cut gear worm are in arrangements all parallel with the longitudinal axis of the worm through the greater part of its length except at its end reduced by the swedging operation employed for forming the end.

These longitudinal and axial parallel arrangements of particles are severed by machine cutting away the material to form the threads. Likewise the particles have a substantially uniform density throughout the worm.

The improved gear worms 10 are stronger in any plane, than machine cut gear worms 20; and in all but one plane, than worms formed according to the method of my prior patent, No. 1,474,516, for the reason that it is impossible to carry out the method of my prior patent without severing the material at the sides of the gear worm when it is being forged without rotation between the preliminary sides.

Machine cut gear worms as illustrated in Fig. 3 were tested as beams supported at their ends, each upon two bearings six inches apart, and each loaded at the center upon the top of the center thread. These worms broke at loads between 60,000 and 70,000 pounds.

Worms embodying the improvements herein and having the same external dimensions, as the aforesaid tested machine cut worms, each were supported on bearings 6 inches apart, and subject to a load applied at the center on top of the center thread. These worms did not break at 100,000 pounds load.

The steel of both machine cut and the improved forged worms had the same analysis.

A further advantage of the improved forged gear worms of the present invention lies in the fact that they may be finish swedged, either hot or cold, for further densifying the outer particles thereof, after being subject to the operations set forth in my prior application, Serial No. 118,659, after which the worms may be finish ground ready for use, without requiring any finish machine cutting or hobbing operation.

Another advantage of the improved forged gear worms herein set forth, is that the heat of friction generated by the pressure of the gear wheel against the gear worm when the same is in use, is carried away by the dense and continuous longitudinal and spiral arrangement of the outer particles of the improved worms; whereas, in machine cut worms the severed ends of the cylindric arrangements tend to retain the heat of friction.

Likewise the greater denseness of the wearing surfaces of the improved gear worm enables a smoother action against the gear wheel; and the spirally arranged particles, in addition to carrying away the heat of friction, generate less heat by the action with the worm wheel, than is generated by the threads of ordinary machine cut gear worms having severed arrangements of particles.

Finally, the gear worms of the present invention are very economical of material, and require less material than the forged gear worms of my prior patent, No. 1,474,516 as aforesaid, because no fins are made during the process of manufacturing the present gear worms.

Obviously there is a very substantial saving in material in the present improved worm as compared with a machine cut gear worm.

I claim:

1. An integral gear worm including helically located thread particles rearranged in varying denseness from a longitudinal location.

2. An integral gear worm including at any longitudinal plane a varying denseness of continuously arranged particles following the contour of the worm threads.

3. A gear worm including a greater denseness of continuously arranged particles adjacent the wearing surfaces thereof than in the central portions thereof.

4. An integral gear worm including a varying denseness of helically, continuously arranged particles forming the threads thereof.

5. An integral gear worm including a varying denseness of helically and longitudinally continuously arranged particles forming the threads thereof.

6. An integral gear worm including at any plane a varying denseness of continuously arranged particles forming the threads thereof.

7. An integral gear worm including a shaft and threads formed thereon, the shaft and threads including at any plane a varying denseness of continuously arranged particles.

In testimony that I claim the above, I have hereunto subscribed my name.

ALBERT L. EICHER.